United States Patent [19]

Hirasawa et al.

[11] Patent Number: 5,286,287
[45] Date of Patent: Feb. 15, 1994

[54] MONOAZO LAKE PIGMENT SUITABLE FOR USE IN PRINTING INK AND PROCESS FOR THE PRODUCTION THEREOF

[75] Inventors: Yuuji Hirasawa; Akimitsu Mochizuki, both of Tokyo, Japan

[73] Assignee: Toyo Ink Manufacturing Co., Ltd., Tokyo, Japan

[21] Appl. No.: 942,219

[22] Filed: Sep. 9, 1992

Related U.S. Application Data

[63] Continuation-in-part of Ser. No. 773,117, Oct. 8, 1991, abandoned.

[30] Foreign Application Priority Data

Oct. 11, 1990 [JP] Japan ................. 2-272628

[51] Int. Cl.$^5$ ............. C09D 11/02; C09D 17/00; C09B 63/00; C09B 29/20
[52] U.S. Cl. ................. 106/22 K; 106/22 R; 106/23 R; 106/23 K; 106/493; 106/494; 534/563; 534/564; 534/565; 534/863
[58] Field of Search ........... 534/573 M, 563, 564, 534/565, 863; 106/493, 494, 22 K, 22 R, 23 R, 23 K

[56] References Cited

U.S. PATENT DOCUMENTS

| | | | |
|---|---|---|---|
| 2,521,908 | 9/1950 | Glass et al. | 534/863 X |
| 4,115,055 | 9/1978 | Dieter et al. | 534/863 X |
| 4,154,577 | 5/1979 | Miederer et al. | 534/863 X |
| 4,767,844 | 8/1988 | Ando et al. | 534/573 |

Primary Examiner—Floyd D. Higel
Attorney, Agent, or Firm—Wenderoth, Lind & Ponack

[57] ABSTRACT

A monoazo lake pigment and a process for its production; the monoazo lake pigment excellent in clearness, transparency, gloss and tinting strength is obtained by coupling a diazo component which is an aromatic amine having a sulfonic acid group with a coupler component which contains β-naphthol or β-oxynaphthoic acid and adding a laking agent during or after the coupling reaction, the coupler component further containing 0.1 to 30 mol %, based the coupler component, of a compound of the following formula,

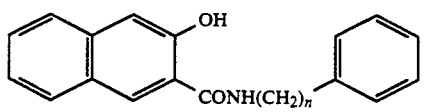

wherein $n = 1$ or 2.

9 Claims, No Drawings

MONOAZO LAKE PIGMENT SUITABLE FOR USE IN PRINTING INK AND PROCESS FOR THE PRODUCTION THEREOF

This application is a continuation-in-part of now abandoned application Ser. No. 07/773,117 filed Oct. 8, 1991.

FIELD OF THE INVENTION

The present invention relates to a monoazo lake pigment suitable for use in a printing ink and a process for the production thereof.

PRIOR ART OF THE INVENTION

Conventionally, a monoazo lake pigment obtained from an aromatic amine having a soluble group and either β-naphthol or β-oxynaphthoic acid is widely used as a color pigment in a printing ink, a coating composition and a plastic. In particular, a large amount of Pigment Red 57 (C.I. 15850) is used as a pigment for a process deep-red ink. In order to impart these monoazo lake pigments with a clear color tone and improved tinting strength, the monoazo lake pigment is treated with 1 to 30% by weight, based on the monoazo lake pigment, of rosin. For example, the above Pigment Red 57 is a product obtained by treatment with as large as 20 to 30% by weight, based on the monoazo lake pigment, of rosin.

The above monoazo lake pigment has the following defects: When the pigment is used in a printing ink, the resultant ink composition, if it is a gravure ink, shows a high viscosity, and the ink is unstable with time. When the above pigment is used in an offset ink (lithographic ink), a rosin component is eluted into a dampening solution, and when the offset ink is emulsified in water, the fluidity of the resultant ink composition changes, or the surface tension of the emulsifying water decreases. As a result, the printability of the printing ink decreases.

In order to overcome the above defects, a study has been under way on a process for synthesizing a rosinless pigment or a pigment whose rosin content is decreased to 1 to 7% by weight. However, pigments obtained by such a process show an unclear color tone and a decreased tinting strength.

Further, it is known to improve a monoazo lake pigment by mixing the monoazo lake pigment with a naphthol AS or its derivative and subjecting the mixture to a coupling reaction (U.S. Pat. No. 4,767,844). However, the resultant monoazo lake pigment is not satisfactory in respect of tinting strength, color tone and clearness.

SUMMARY OF THE INVENTION

It is an object of the present invention to provide a monoazo lake pigment which is excellent in clearness, transparency, gloss and tinting strength and a process for the production thereof.

It is another object of the present invention to provide a printing ink composition containing the above pigment, which is excellent in fluidity and stability with time.

It is further another object of the present invention to provide a pigment which exhibits excellent properties when used in a coating composition and plastic.

According to the present invention, there is provided a monoazo lake pigment obtained by coupling a diazo component which is an aromatic amine having a sulfonic acid group with a coupler component which contains β-naphthol or β-oxynaphthoic acid and adding a laking agent during or after the coupling reaction, the coupler component further containing 0.1 to 30 mol %, based the coupler component, of a compound of the following formula,

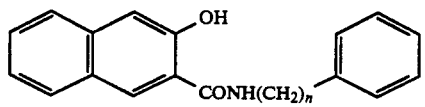

wherein $n=1$ or 2.

According to the present invention, there is provided a process for producing a monoazo lake pigment, which comprises coupling a diazo component which is an aromatic amine having a sulfonic acid group with a coupler component which contains β-naphthol or β-oxynaphthoic acid and adding a laking agent during or after the coupling reaction, the coupler component further containing 0.1 to 30 mol %, based the coupler component, of a compound of the following formula,

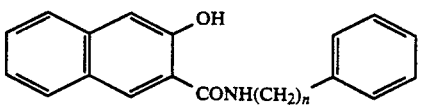

wherein $n=1$ or 2.

Further, according to the present invention, there is provided a coating composition containing, as a colorant, the above monoazo lake pigment.

Furthermore, according to the present invention, there is provided a plastic containing, as a colorant, the above monoazo lake pigment.

DETAILED DESCRIPTION OF THE INVENTION

The aromatic amine having a sulfonic acid group, used in the present invention, includes aromatic compounds having an amino group and a sulfonic acid group. Specific examples of these compounds include aminobenzenesulfonic acids such as 2-aminobenzenesulfonic acid, 3-aminobenzenesulfonic acid, 4-aminobenzenesulfonic acid, 2-amino-5-methylbenzenesulfonic acid, 5-amino-2-methylbenzenesulfonic acid, 4-amino-2-methylbenzenesulfonic acid, 4-amino-3-methylbenzenesulfonic acid, 2-amino-5-methoxybenzenesulfonic acid, 4-amino-3-methoxybenzenesulfonic acid, 4-amino-2-methoxybenzenesulfonic acid, 3-amino-4-methoxybenzenesulfonic acid, 5-amino-2-chlorobenzenesulfonic acid, 3-amino-4-chlorobenzenesulfonic acid, 4-amino-2,5-dichlorobenzenesulfonic acid, 3-amino-4-hydroxybenzenesulfonic acid, 3-amino-4,6-dimethylbenzenesulfonic acid, 3-acetylamino-5-aminobenzenesulfonic acid and 2-amino-5-nitrobenzenesulfonic acid; aminonaphthalenesulfonic acids such as 2-amino-1-naphthalenesulfonic acid, 5-amino-1-naphthalenesulfonic acid, 8-amino-1-naphthalenesulfonic acid, 2-amino-6-naphthalenesulfonic acid, 5-acetylamino-2-amino-1-naphthalenesulfonic acid, 2-amino-8-benzoylamino-1-naphthalenesulfonic acid and 6-amino-2-naphthalenesulfonic acid; and aminonaphthalenedisulfonic acids such as 7-amino-1,3-naphthalenedisulfonic acid, 6-amino-1,3-naphthalenedisulfonic acid, 2-amino-6,8-naphthalenedisulfonic acid, 4-(4'-amino-3'-methoxyphenylazo)benzenesulfonic acid and 4,4'-diaminodiphenyl-2,2-disulfonic acid.

The coupler component used in the present invention is selected from known compounds such as β-naphthol and β-oxynaphthoic acid.

The compound of the above formula used in combination with the coupler component is a product obtained by a reaction between β-oxynaphthoic acid and either benzylamine or phenetylamine. The amount of the compound of the formula for use based on each of the β-naphthol and the β-oxynaphthoic acid is 0.1 to 30 mol %, preferably 0.3 to 15 mol %. When this amount is less than the above lower limit, a monoazo lake pigment having high tinting strength, high clearness, high gloss and excellent fluidity cannot be obtained. When this amount exceeds the above upper limit, no further effect corresponding to such an excess amount can be obtained.

The monoazo lake pigment of the present invention can be produced from the above materials according to a known method for producing conventional monoazo lake pigments. That is, the aromatic amine having a sulfonic acid group is diazotized by a conventional method, and on the other hand, the coupler component is prepared by mixing the above β-naphthol or β-oxynaphthoic acid with the compound of the formula according to a conventional method. And, the resultant diazo component and the coupler component are mixed with each other and coupled in a reaction.

Then, the synthesized dye is formed into a lake pigment with a lakeing agent, or a lakeing agent is added to the coupler component before the coupling reaction, and the coupling reaction is carried out, whereby the monoazo lake pigment of the present invention having improved properties as described above can be obtained.

The lakeing agent is selected from known mineral acid and organic acid salts of calcium, strontium, barium, etc., such as sulfates, nitrates, hydrochlorides, phosphates, etc., and salts of manganese such as the above mineral acids and organic acids.

The pigment may be surface-treated by adding any one of water-soluble resin, a surfactant and other additive to the diazo component, the coupler component or a slurry of the dye or the pigment.

The monoazo lake pigment obtained in the above manner has a remarkably higher tinting strength and clearness than conventional monoazo lake pigments, and it is free from a decrease in printability, which decrease is caused when conventional rosin-treated pigments are contained in printing inks.

According to the present invention, there is provided a process for producing the above monoazo lake pigment, which is excellent in thermal stability under heat treatment when synthesized and when treated from an aqueous paste to a pigment. That is, in conventional processes for synthesizing monoazo lake pigments, pigment particles undergo crystal growth under heat treatment for synthesizing monoazo lake pigments or for flushing, and as a result, the resultant monoazo lake pigments show an extraordinary decrease in tinting strength. In contrast, the process of the present invention does not involve such a defect, and can produce a monoazo lake pigment very effectively.

Further, according to the present invention, there is provided an ink containing the monoazo lake pigment of the present invention and a vehicle for a printing ink. The vehicle for an offset ink comprises 20 to 50 parts be weight of a resin such as a rosin-modified phenolic resin, a petroleum resin, an alkyd resin or a drying oil-modified resin of these and 10 to 60 parts by weight of a solvent such as n-paraffin, isoparaffin, aromatic, naphthene or α-olefin. An offset ink can be prepared by incorporating the monoazo lake pigment of the present invention to the above vehicle, and adding known additive(s) such as other solvent for an ink, a dryer, a leveling improver, a thickener, etc.

A gravure ink contains 10 to 50 parts by weight of a resin mixture, 30 to 80 parts by weight of a solvent, 3 to 35 parts by weight of the monoazo lake pigment of the present invention and 1 to 20 parts by weight of an extender. The component for the resin mixture is selected from gum rosin, wood rosin, tall oil rosin, calcified rosin, lime rosin, rosin ester, a maleic acid resin, gilsonite, dammar, shellac, a polyamide resin, a vinyl resin, nitrocellulose, cyclized rubber, chloride rubber, ethylcellulose, cellulose acetate, and ethylene-vinyl acetate copolymer, a urethane resin, a polyester resin and an alkyd resin. The solvent is selected from n-hexane, toluene, ethanol, methanol, acetone, ethyl acetate, ethyl lactate, cellosolve, diacetone alcohol, chlorobenzole, ethyl ether, acetal ethyl ether, ethyl acetoacetate and butylcellosove acetate. The extender is selected from barium sulfate, barium carbonate, calcium carbonate, gypsum, alumina white, clay, silica, talc, calcium silicate and precipitating magnesium carbonate. The ink may further contain other aid(s) such as a plasticizer, an ultraviolet light preventer, an antioxidant, an antistatic agent, etc.

The monoazo lake pigment of the present invention has higher tinting strength and higher transparency than any one of conventional monoazo lake pigments. Further, in addition to these effects, the monoazo lake pigment of the present invention shows excellent fluidity.

When a conventional azo pigment treated with a large amount of rosin is used in a printing ink, the printability of the ink is decreased. In contrast, an ink containing the monoazo lake pigment of the present invention exhibits excellent printability.

Further, the monoazo lake pigment produced according to the process of the present invention is excellent in thermal stability under heat treatment for flushing. That is, in a conventional process for producing a monoazo lake pigment, crystal growth and aggregation of pigment particles occur under heat treatment for flushing, which crystal growth and aggregation are causes for rendering an ink opaque and a decrease in tinting strength of an ink. The monoazo lake pigment produced according to the process of the present invention is free from such defects.

The present invention will be described further in detail hereinafter by reference to Examples, in which "part" stands for "part by weight" and "%" stands for "% by weight".

EXAMPLE 1 AND COMPARATIVE EXAMPLE 1

18.7 Parts of 2-amino-5-methylbenzenesulfonic acid was stirred together with 400 parts of water and 4 parts of sodium hydroxide at room temperature for 30 minutes to completely dissolve the 2-amino-5-methylbenzenesulfonic acid in the water. 25 Parts of 35% hydrochloric acid was added to the resultant solution to acidify the solution, and then 20 parts of ice was added to cool the solution to a temperature between 0° C. and 3° C. A solution of 7 parts of sodium nitrite in 25 parts of water was added, and the resultant mixture was stirred at a temperature not higher than 5° C. for 30 minutes to give a diazo component.

Separately, 15.5 parts of β-oxynaphthoic acid and 3.5 parts of the following compound (1) were stirred together with 1 part of natural rosin, 1,000 parts of water and 10 parts of sodium hydroxide at a temperature of 40° C. for 20 minutes to completely dissolve these components in the water, and the resultant solution was cooled to 15° C. to give a coupler component.

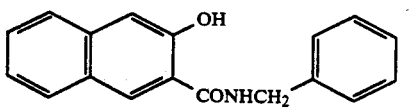
(1)

The above diazo component was added dropwise to the coupler component over 30 minutes, and further, the resultant mixture was stirred for 1 hour to complete the coupling reaction. The coupling reaction mixture had pH of 9.5 to 10.0. Then, 58 parts of a 35% calcium chloride aqueous solution was added, and the resultant mixture was stirred for 2 hours to carry out a lake-forming reaction. The reaction mixture was heated to 80° C., and filtered. The remaining solid was washed with water, dried and milled to give 43 parts of a monoazo lake pigment (Example 1).

The above procedure was repeated except that 15.5 parts of the β-oxynaphthoic acid and 3.5 parts of the compound (1) were replaced with 18.6 parts of β-oxynaphthoic acid, whereby 43 parts of a monoazo lake pigment (Comparative Example 1) was obtained.

The above-obtained monoazo lake pigments were respectively formulated into inks as follows.

A varnish was prepared by adding 20 parts of linseed oil and 30 parts of No. 5 solvent (ink solvent, supplied by Nippon Oil Co., Ltd.) to 50 parts of a rosin-modified phenolic resin (Tamanol 361, supplied by Arakawa Chemical Industries, Inc.) and forming a dissolved varnish from the resultant mixture under heat at 200° C. Then, 2 parts of aluminum octylate was added to 98 parts of the varnish to form a varnish gel.

70 Parts of the varnish gel, 20 parts of the monoazo lake pigment (red pigment) obtained in Example 1 and 10 parts of No. 1 solvent (ink solvent, supplied by Nippon Oil Co., Ltd.) were mixed, and the resultant mixture was kneaded with a three-roll mill to give an offset ink having a tackiness value of 9.0. Further, an offset ink having a tackiness value of 9.0 was also obtained from the monoazo lake pigment of Comparative Example 1 in the same manner as above. The offset ink containing the monoazo lake pigment of Example 1 (present pigment) was remarkably superior to the offset ink containing the monoazo lake of Comparative Example 1 (comparative pigment) in transparency, clearness (visually evaluated) and tinting strength. In addition, the tinting strength was evaluated by spreading (drawing down) a mixture of a white ink with the above offset ink containing the present pigment and a mixture of a white ink with the above offset ink containing the comparative pigment. The offset ink containing the present pigment had higher tinting strength than the offset ink containing the comparative pigment. That is, when the color density of the mixture of the offset ink containing the present pigment was rendered equal to that of the mixture of the offset ink containing the comparative pigment, the amount of the white ink in the mixture of the offset ink containing the present pigment could be increased by about 10%.

EXAMPLE 2 AND COMPARATIVE EXAMPLE 2

18.7 Parts of 2-amino-5-methylbenzenesulfonic acid was diazotized according to a conventional method, and 58 parts of a 35% calcium chloride aqueous solution was added to give a diazo solution.

Separately, 15 parts of β-oxynaphthoic acid and 4.0 parts of the following compound (2) were mutually dissolved according to a conventional method to give a coupler solution.

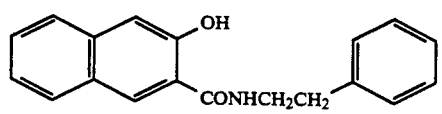
(2)

The coupler solution was rapidly mixed with the above diazo solution to complete the coupling reaction and the lake-forming reaction, and the reaction mixture was heated to 80° C. and filtered. The remaining solid was washed with water to give 43 parts of a monoazo lake pigment (Example 2).

The above procedure was repeated except that 15 parts of the β-oxynaphthoic acid and 4.0 parts of the compound (2) were replaced with 18.0 parts of β-oxynaphthoic acid, whereby a monoazo lake pigment (Comparative Example 2) was obtained.

Offset inks were prepared from the above monoazo lake pigments in the same manner as in Example 1. The offset ink containing the monoazo lake pigment of Example 2 was remarkably superior to the offset ink containing the monoazo lake pigment of Comparative Example 2 in transparency, clearness and tinting strength.

EXAMPLE 3 AND COMPARATIVE EXAMPLE 3

16.4 parts of 2-amino-5-methylbenzenesulfonic acid and 0.3 part of 2-amino-1-naphthalenesulfonic acid were diazotized according to a conventional method, and 58 parts of a 35% calcium chloride aqueous solution was added to give a diazo component.

Separately, 16 parts of β-naphthol, 1.0 part of the following compound (1) and 1 part of natural rosin were mutually dissolved to give a coupler component.

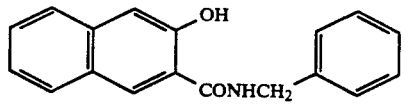
(1)

The above two components were mixed to complete the coupling reaction and the lake-forming reaction, and the reaction mixture was heated to 80° C. and filtered. The remaining solid was washed with water to give 44.5 parts of a monoazo lake pigment (Example 3).

The above procedure was repeated except that 16 parts of the β-naphthol and 1.0 parts of the compound (1) were replaced with 16.6 parts of β-naphthol, whereby a monoazo lake pigment (Comparative Example 3) was obtained.

Offset inks were prepared from the above monoazo lake pigments in the same manner as in Example 1. The offset ink containing the monoazo lake pigment of Example 3 was remarkably superior to the offset ink containing the monoazo lake pigment of Comparative Example 3 in transparency, clearness and tinting strength.

EXAMPLE 4 AND COMPARATIVE EXAMPLES 4 AND 5

Example 2 was repeated except that the compound (2) was replaced with 3.5 parts of the compound (1), whereby 41 parts of a monoazo lake pigment (Example 4) was obtained.

Example 2 was repeated except that 15 parts of the β-oxynaphthoic acid and 4.0 parts of the compound (2) were replaced with 18.1 parts of β-oxynaphthoic acid, whereby 40 parts of a monoazo lake pigment (Comparative Example 4) was obtained. Further, Example 2 was repeated except that 4.0 parts of the compound (2) was replaced with 3.5 parts of naphthol AS, whereby 42 parts of a monoazo lake pigment (Comparative Example 5) was obtained.

1. Preparation of base ink

Lime rosin: 84 parts
Toluene: 46 parts
Pigment: 25 parts

155 Grams of a mixture of the above components was charged into a 225 ml glass bottle together with 180 g of steel balls having a diameter of 3 mm, and dispersed with a paint conditioner (to be referred to "PC" hereinafter) for 40 minutes.

2. Preparation of adjustment ink

Base ink: 54.5 parts
Line rosin: 39 parts
Toluene: 10 parts

85 Grams of a mixture of the above components was charged into a 140 ml glass bottle and mixed with PC for 5 minutes. Then the amount of toluene was adjusted such that the viscosity of the mixture became 15 seconds with a silk cup #2.

3. Preparation of light-color ink

Base ink: 3.1 parts
White ink: 30 parts

33 Grams of a mixture of the above component was charged into a 70 ml glass bottle, and mixed with PC for 5 minutes to obtain a light color ink.

4. Application of ink (1) Adjustment inks were respectively coated on a coat paper with a #3 bar coater to measure their transparency. The adjustment inks were also coated on nonpenetrate paper to measure their glossiness.

(2) Light color inks were coated on a coat paper with a #6 bar coater to measure their tinting strength.

5. Measurement of property values

Base inks were measured for viscosities with a Brookfield viscometer.

Deep-color inks spread on nonpenetrate paper were measured for glossiness values at 60 degrees with a digital angle-variable glossmeter (model UGV-5D) supplied by Suga Shikenki (k.K.).

Light-color inks spread on a coat paper were measured for K values with a color machine (model Σ80) supplied by Nippon Denshoku Kogyo. The tinting strength was expressed as a relative value to the L-value of Comparative Example 4 which was taken as 100.

The transparency was visually evaluated on inks spread on a black band. (5: transparent, 4: transparent to some extent, 3 STD=Comparative Example 4, 2: opaque to some extent, 1: opaque)

The hue was visually evaluated on inks spread on coat paper.

The gravure ink containing the monoazo lake pigment of Example 4 was remarkably superior to the gravure inks containing the monoazo lake pigment of Comparative Example 4 and the monoazo lake pigment of Comparative Example 5 in fluidity, tinting strength, transparency and gloss.

TABLE 1

| | Transparency | Hue | Gloss (%) | Viscosity (CPS:6/60 rpm) | Tinting strength (%) |
|---|---|---|---|---|---|
| Example 4 | 5 | Yellowish to some extent | 40.7 | 50/50 | 110 |
| Comparative Example conventionally treated | 3 | STD | 36.4 | 125/125 | STD |
| Comparative Example treated with naphthol AS | 4 | Yellowish to some extent | 35.0 | 400/220 | 105 |

What is claimed is:

1. A monoazo lake pigment obtained by coupling a diazo component which is an aromatic amine having a sulfonic acid group with a coupler component which contains β-naphthol or β-oxynaphthoic acid and adding a laking agent during or after the coupling reaction, the coupler component further containing 0.1 to 30 mol %, based the coupler component, of a compound of the following formula,

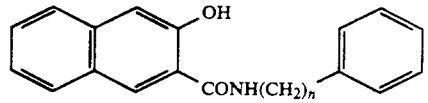

wherein n=1 or 2.

2. A monoazo lake pigment according to claim 1, wherein the aromatic amine having a sulfonic acid group is at least one member selected from the class consisting of aminobenzenesulfonic acid and aminonaphthalenesulfonic acid.

3. A monoazo lake pigment according to claim 2, wherein the aromatic amine having a sulfonic acid group is at least one member selected from the class consisting of 2-amino-5-methylbenzenesulfonic acid, 2-amino-4-chloro-5-methylbenzenesulfonic acid, 2-amino-5-chloro-4-methylbenzenesulfonic acid and 2-amino-1-naphthalenesulfonic acid.

4. A monoazo lake pigment according to claim 1, wherein the compound of the formula recited in claim 1 is contained in an amount of 0.3 to 15 mol % based on the coupler component.

5. A printing ink composition containing the monoazo lake pigment recited in claim 1 and a vehicle for use in a printing ink.

6. A printing ink composition according to claim 5, wherein the vehicle for use in a printing ink is for use in an offset ink and contains 20 to 50 parts by weight of a resin, 0 to 30 parts by weight of a plant oil and 10 to 60 parts by weight of a solvent.

7. A printing ink composition according to claim 5, wherein the vehicle for use in a printing ink is for use in a gravure ink and contains 10 to 50 parts by weight of a resin mixture, 30 to 80 parts by weight of a solvent and 1 to 20 parts by weight of an extender.

8. A coating composition containing, as a colorant, the monoazo lake pigment recited in claim 1.

9. A plastic containing, as a colorant, the monoazo lake pigment recited in claim 1.

* * * * *